United States Patent
Li et al.

(10) Patent No.: US 12,522,757 B2
(45) Date of Patent: Jan. 13, 2026

(54) LIQUID MOISTURE CURABLE POLYURETHANE WITH IMPROVED ADHESION TO ALUMINUM

(71) Applicant: Henkel AG & Co. KGaA, Duesseldorf (DE)

(72) Inventors: Yingjie Li, Batavia, IL (US); Shuhui Qin, Palatine, IL (US)

(73) Assignee: Henkel AG & Co. KGaA, Duesseldorf (DE)

(*) Notice: Subject to any disclaimer, the term of this patent is extended or adjusted under 35 U.S.C. 154(b) by 246 days.

(21) Appl. No.: 18/201,499

(22) Filed: May 24, 2023

(65) Prior Publication Data

US 2023/0295479 A1    Sep. 21, 2023

Related U.S. Application Data

(63) Continuation of application No. PCT/US2021/062090, filed on Dec. 7, 2021.
(Continued)

(51) Int. Cl.
*C09J 175/08* (2006.01)
*B32B 7/12* (2006.01)
(Continued)

(52) U.S. Cl.
CPC ............. *C09J 175/08* (2013.01); *B32B 7/12* (2013.01); *B32B 15/10* (2013.01); *B32B 15/18* (2013.01);
(Continued)

(58) Field of Classification Search
CPC ............. C09J 175/08; C09J 2400/163; C09J 2475/00; C09J 5/00; C09J 7/28;
(Continued)

(56) References Cited

U.S. PATENT DOCUMENTS

| | | | |
|---|---|---|---|
| 2,402,631 A * | 6/1946 | Hull | D06M 23/18 |
| | | | 156/380.9 |
| 3,087,900 A | 4/1963 | Brown | |

(Continued)

FOREIGN PATENT DOCUMENTS

| | | |
|---|---|---|
| CN | 106753179 A | 5/2017 |
| CN | 111662671 A | 9/2020 |

(Continued)

OTHER PUBLICATIONS

BestTechnology Aluminum Coating (https://www.besttechnologyinc.com/surface-finishing/what-is-alodine-chem-film-chromate-conversion-coating/ ) (Year: 2020).*

(Continued)

*Primary Examiner* — George R Koch
*Assistant Examiner* — Christopher C Caillouet
(74) *Attorney, Agent, or Firm* — Sun Hee Thomas

(57) ABSTRACT

Disclosed is a one component, liquid, moisture curable polyurethane adhesive composition comprising the reaction products of a mixture including at least one polyol with an excess of one or more polyisocyanates and an acid component. The adhesive composition has enhanced bond strength to metals such as aluminum compared to currently available adhesives. The composition finds special use in panel lamination applications.

20 Claims, 2 Drawing Sheets

| | Ex. A | Ex. 1 | Ex. 2 | Ex. 3 | Ex. 4 |
|---|---|---|---|---|---|
| % adhesion | 10% | 90% | 90% | 80% | 80% |

Related U.S. Application Data

(60) Provisional application No. 63/126,079, filed on Dec. 16, 2020.

(51) Int. Cl.
   *B32B 15/10*          (2006.01)
   *B32B 15/18*          (2006.01)
   *B32B 15/20*          (2006.01)
   *B32B 37/12*          (2006.01)

(52) U.S. Cl.
   CPC .............. *B32B 15/20* (2013.01); *B32B 37/12* (2013.01); *B32B 2255/06* (2013.01); *B32B 2255/26* (2013.01); *B32B 2311/24* (2013.01); *B32B 2311/30* (2013.01); *B32B 2317/16* (2013.01)

(58) Field of Classification Search
   CPC .... C09J 7/29; C09J 2203/35; C09J 2203/354; C09J 2301/306; C09J 2400/30; B32B 7/12; B32B 15/10; B32B 15/18; B32B 15/20; B32B 37/12; B32B 2255/06; B32B 2255/26; B32B 2311/24; B32B 2311/30; B32B 2317/16; B32B 2250/03; B32B 2250/40; B32B 2250/44; B32B 2270/00; B32B 2307/5825; B32B 2405/00; B32B 2605/10; B32B 2605/12; B32B 15/08; B32B 15/095; B32B 21/08; B32B 27/40; C08K 5/09; C08K 5/42; C08K 2003/309; C08K 2003/329; C08G 18/12; C08G 18/2081; C08G 18/7664; C08G 18/4825
   See application file for complete search history.

(56) References Cited

U.S. PATENT DOCUMENTS

| | | |
|---|---|---|
| 3,087,901 A | 4/1963 | Brown |
| 3,179,625 A | 4/1965 | Ehrhart |
| 4,433,680 A | 2/1984 | Yoon |
| 4,574,793 A | 3/1986 | Lee et al. |
| 5,195,946 A | 3/1993 | Li et al. |
| 5,455,294 A | 10/1995 | Sheng |
| 5,527,266 A | 6/1996 | Hiraishi et al. |
| 6,180,713 B1 | 1/2001 | Araki et al. |
| 11,965,092 B2 * | 4/2024 | Zhu .................. C09J 175/08 |
| 2004/0063869 A1 | 4/2004 | Minamida et al. |
| 2005/0033004 A1 | 2/2005 | Hoffmann et al. |
| 2010/0003526 A1 | 1/2010 | Burckhardt et al. |
| 2011/0014479 A1 | 1/2011 | Song et al. |
| 2017/0157883 A1 * | 6/2017 | Sing ........................ B32B 5/18 |
| 2020/0216728 A1 | 7/2020 | Li et al. |
| 2020/0395885 A1 * | 12/2020 | Janowski .............. E06B 3/4407 |

FOREIGN PATENT DOCUMENTS

| | | |
|---|---|---|
| EP | 0856551 A1 | 8/1998 |
| EP | 2242784 B1 | 10/2013 |

OTHER PUBLICATIONS

SpecRite Anodized vs Mill (https://www.ngp.com/ngp/cache/file/198C8FD6-2838-4320-9863000C16DD57FA.pdf) (Year: 2016).*
Anna Rudawska, "Surface Treatment in Bonding Technology," Elsevier, 2019, p. 129, p. 130, p. 132, p. 133, p. 136.
International Search Report for PCT/US2021/062090; Mailing date: Apr. 12, 2022.

* cited by examiner

| Ex. A | Ex. 1 | Ex. 2 | Ex. 3 | Ex. 4 |
| --- | --- | --- | --- | --- |
| % adhesion 10% | 90% | 90% | 80% | 80% |

| Ex. F | Ex. 6 | Ex. 7 | Ex. 8 | Ex. 9 |
| --- | --- | --- | --- | --- |
| % adhesion 0% | 80% | 70% | 10% | 20% |

LIQUID MOISTURE CURABLE POLYURETHANE WITH IMPROVED ADHESION TO ALUMINUM

TECHNICAL FIELD

This disclosure relates generally to one component, liquid, moisture curable polyurethane adhesive compositions and more particularly to such compositions having enhanced adhesion to metal components, particularly aluminum components. The disclosure also relates to a method for improving bond strength of one component liquid moisture curable polyurethane compositions to aluminum substrates, in particular mill grade aluminum substrates, and to a method of bonding composite structures comprising aluminum components using one component, liquid, moisture curable polyurethane adhesive compositions.

BACKGROUND OF THE INVENTION

This section provides background information which is not necessarily prior art to the inventive concepts associated with the present disclosure.

Composite structures are widely used to make vehicles in the transportation field. Examples of such composite structures include commercial trailers, train cars, aircraft components, recreational vehicles, boats and automobiles. One conventional composite structure comprises a welded aluminum frame having a polymer skin bonded to one surface, a wood skin bonded to the opposing surface and foam between the polymer and wood skins. Curable polyurethane adhesives are typically used to bond the polymer skin to the aluminum frame and the wood skin to the aluminum frame.

Hot melt adhesives have been proposed as one composite bonding adhesive. Hot melt adhesives are solid at room temperature but, upon application of heat, they melt to a liquid or fluid state in which form they are applied to a substrate. On cooling, the adhesive regains its solid form. One class of hot melt adhesives are thermoplastic hot melt adhesives. Another class of hot melt adhesives are reactive polyurethane hot melt adhesives that start out as thermoplastic materials but when exposed to appropriate conditions crosslink and cure to an irreversibly solid form. However, hot melt adhesives require specialized equipment to heat and maintain the adhesive in molten form as well as specialized application equipment. Such equipment is not available in all manufacturing locations. Hot melt adhesives solidify quickly after application, limiting the ability to reposition components after application. Further, once heated the adhesives will increase in viscosity to an unusable level and thus have a limited pot life during which they can be used.

Another type of polyurethane based adhesive is the one component, moisture curable polyurethane adhesive that are liquid at room temperature. Their liquid form allows ease of application using conventional equipment without the complicated heating equipment needed for hot melt adhesives. They also cure more slowly and allow repositioning of components for some time after application. One component, moisture curable polyurethane adhesives are generally based on isocyanate containing polyurethane prepolymers. The adhesives are stored under conditions that exclude moisture. When exposed to moisture isocyanate moieties on the prepolymers irreversibly crosslink to form a cured thermoset reaction product.

Good adhesion of the polyurethane adhesive to each of the composite components is desirable to add strength to the composite structure. Ideally, the adhesive bonding strength will be greater than some, or all, of the materials it is bonded to. Additionally, water can infiltrate into a bonded composite structure. The adhesive should retain as much of the initial bond strength as possible during and after exposure to water.

Currently, manufacturers use a multi-step process to form composite structures. In a first step the metallic frame is cleaned to remove oil, grease and dirt. Next the frame is exposed to conversion coating chemicals in a bath or spray application, rinsed with water and dried. The conversion coated frame is now ready for application of adhesive and assembly into a composite structure. This process requires multiple large tanks of chemicals, lifting and drying equipment and substantial space. In a different multi step process, the metallic frame is cleaned to remove oil, grease and dirt. Next the frame is hand wiped by workers using towels saturated with conversion chemicals such as Alodine wipes from Henkel Corporation and dried. The conversion coated frame is now ready for application of adhesive and assembly into a composite structure. This method does not require the conversion coating tanks and related equipment. However, manually wiping the entire frame requires substantial effort and time and has the risk that workers can miss some areas of the frame.

It is desirable to provide a one component, liquid polyurethane adhesive composition having increased adhesion strength to one or more composite components. It is desirable to provide a one component, liquid polyurethane adhesive composition will have increased adhesion strength without requiring conversion coatings on the metallic components. It is desirable to provide a one component, liquid polyurethane adhesive composition that would substantially retain the increased strength during and after exposure to water. It is desirable to provide a one component, liquid polyurethane adhesive composition should be useful with existing processes and equipment and not require heating to a molten state for use.

SUMMARY OF THE DISCLOSURE

This section provides a general summary of the disclosure and is not a comprehensive disclosure of its full scope or all features, aspects or objectives.

In one embodiment, the disclosure is a one component, liquid, moisture curable polyurethane adhesive composition comprising the reaction products of: at least one polyol; at least one organic polyisocyanate, and an acid component.

In one embodiment, the disclosure is a one component, liquid, moisture curable polyurethane adhesive composition comprising the reaction products of: at least one polyol; at least one organic polyisocyanate, an acid component and at least one additive.

In one embodiment the polyol in the mixture used to prepare the one component, liquid, moisture curable polyurethane adhesive composition comprises one or more polyether polyols, one or more polyester polyols or both one or more polyether polyol(s) and one or more polyester polyol(s).

In at least one embodiment the adhesive composition further comprises a catalyst. In one embodiment the adhesive composition comprises a metal free catalyst such as 2,2'-dimorpholinodiethylether.

In at least one embodiment the one or more organic polyisocyanates comprises polymeric MDI or a mixture of polymeric MDI and MDI isomers.

In at least one embodiment the disclosure is a process of bonding a skin or panel to a metal frame to form a reinforced composite structure, comprising providing a one component, liquid, moisture curable polyurethane adhesive composition as described in any of the embodiments; disposing the one component, liquid, moisture curable polyurethane adhesive composition on a surface of at least one of the panel or the metal frame; disposing a surface of the panel in contact with the disposed adhesive and adjacent to the surface of the metal frame; and exposing the disposed adhesive to conditions that will initiate curing. In one preferred embodiment the metal frame is aluminum and has not been treated with a conversion coating. In one preferred embodiment the metal frame is mill grade aluminum.

In one embodiment the disclosure comprises an article of manufacture including the disclosed one component, liquid, moisture curable polyurethane adhesive composition in cured or uncured form.

In one embodiment the disclosure comprises cured reaction products of the disclosed one component, liquid, moisture curable polyurethane adhesive composition.

These and other features and advantages of this disclosure will become more apparent to those skilled in the art from the detailed description of a preferred embodiment. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

BRIEF DESCRIPTION OF THE DRAWINGS

Referring now to the drawings wherein like elements are numbered alike in the several Figures.

DETAILED DESCRIPTION OF A PREFERRED EMBODIMENT

Figure 1:
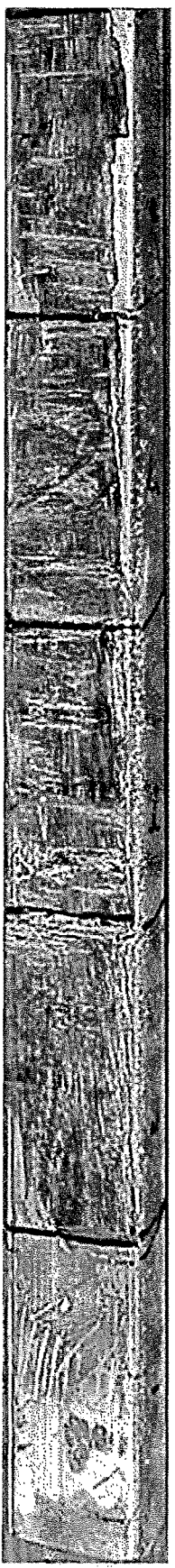
FIG. 1 illustrates % adhesion of some one component, liquid, moisture curable polyurethane adhesive composition to a first sample of a mill grade aluminum substrate.

The singular forms "a", "an" and "the" include plural referents unless the context clearly dictates otherwise.

Unless otherwise defined "about" or "approximately" used in connection with a numerical value refer to the numerical value±10%, preferably ±5% and more preferably ±1% or less.

Unless otherwise defined "%" refers to weight percent.

The term "essentially free" is intended to mean herein that the applicable group, compound, mixture or component constitutes less than 10 wt. %; typically less than 1 wt. %, preferably less than 0.5 wt. %, more preferably less than 0.1 wt. %, and ideally no more than a trace amount based on the weight of the defined composition.

Unless otherwise defined "at least one" means 1 or more, i.e., 1, 2, 3, 4, 5, 6, 7, 8, 9, or more. With reference to an ingredient, the indication refers to the type of ingredient and not to the absolute number of molecules. "At least one polymer" thus means, for example, at least one type of polymer, i.e., that one type of polymer or a mixture of several different polymers may be used.

Unless otherwise defined the terms "comprising", "comprises" and "comprised of" as used herein are synonymous with "including", "includes", "containing" or "contains", and are inclusive or open-ended and do not exclude additional, non-recited members, elements or method steps.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

Unless otherwise defined "liquid" means liquid or flowable under standard room conditions. Typically, liquid materials will have a viscosity of 50,000 cP or less, more typically 20,000 cP or less or preferably 10,000 or less, all at room temperature. As used herein, room temperature is 23° C. plus or minus about 2° C.

As used herein preferred and preferably refer to embodiments of the disclosure that may afford particular benefits, under certain circumstances. However, the recitation of one or more preferable or preferred embodiments does not imply that other embodiments are not useful and is not intended to exclude those other embodiments from the scope of the disclosure.

Unless specifically noted, throughout the present specification and claims the term molecular weight when referring to a polymer refers to the polymer's number average molecular weight (Mn). The number average molecular weight Mn can be calculated based on end group analysis (OH numbers according to DIN EN ISO 4629, free NCO content according to EN ISO 11909) or can be determined by gel permeation chromatography according to DIN 55672 with THF as the eluent. If not stated otherwise, all given molecular weights are those determined by gel permeation chromatography.

The liquid moisture curable polyurethane adhesive compositions comprise isocyanate (NCO) functional polyurethane pre-polymer reaction products formed from reaction of a mixture of one or more polyols and one or more polyisocyanates. There is a molar excess of equivalents of isocyanate to equivalents of OH so that the prepolymer is isocyanate (NCO) functional. The adhesive compositions can optionally comprise a catalyst to control the cure speed of these adhesive compositions and can optionally comprise other additives to control rheology and other processing properties. The disclosed liquid moisture curable polyurethane adhesive compositions cure in the presence of moisture either from the atmosphere or present on a substrate or as added by an operator during use. The cured reaction products form a polyurethane crosslinked network with $CO_2$ given off as a byproduct of the curing process. The thermoset reaction products form structural bonds that have good heat resistance, good chemical resistance, good adhesion to metals with a conversion coating, are free from solvents and can usually be applied at about room temperature.

The disclosed polyurethane adhesive composition can comprise a single component composition. Two-component polyurethane adhesive compositions, wherein the components are stored separately and mixing of the two components starts a cure reaction, are formulated differently from one component polyurethane adhesives. Two component polyurethane adhesives require special handling and equipment and are not interchangeable with one component polyurethane adhesives for every application. Reinforced composite panel manufacturing requires an adhesive that cures rather slowly to allow time for the many panels to be fitted to adhesive disposed on the structural metal frame and also allow repositioning of the panel on the frame at later times. Two component adhesives cure more quickly and do not allow the repositioning desired during manufacture.

In a less preferred embodiment for applications other than reinforced composite panel manufacture, the polyurethane adhesive composition according to the present disclosure can comprise a two component composition. One component comprises the isocyanate functional polyurethane pre-polymer reaction products and other typical ingredients and the separate second component comprises an isocyanate reactive material such as a polyol and other typical ingredients.

The isocyanate functional polyurethane pre-polymer reaction products can be formed by reacting at least one polyol with an excess of at least one polyisocyanate to form an isocyanate functional prepolymer. A small amount of an acid component is added, either to the prepolymer reaction mixture or later to the formed prepolymer. Optional additives can be added to the adhesive composition to aid in stability, rheology and curing of the adhesive composition. The disclosed adhesive composition exhibits a long cure time and develops a surprisingly high bond strength to metals such as aluminum. In some embodiments that enhanced strength is maintained during and after exposure to water. The adhesive composition finds special use in reinforced composite panel lamination processes, such as for example a recreational vehicle assembly process.

Polyols that can be used include those polyols used for the production of polyurethanes, including, without limitation, polyether polyols, polyester polyols, polycarbonate polyols, polybutadiene polyols, polyacetal polyols, polyamide polyols, polyesteramide polyols, polyalkylene polyether polyols, polythioether polyols and mixtures thereof, preferably polyether polyols, polyester polyols, polycarbonate polyols and mixtures thereof. In one embodiment polyether polyols are preferred.

Useful polyester polyols include those that are obtainable by reacting, in a polycondensation reaction, dicarboxylic acids with polyols. The dicarboxylic acids may be aliphatic, cycloaliphatic or aromatic and/or their derivatives such as anhydrides, esters or acid chlorides. Specific examples of these are succinic acid, glutaric acid, adipic acid, pimelic acid, suberic acid, azelaic acid, sebacic acid, dodecandioic acid, phthalic acid, terephthalic acid, isophthalic acid, trimellitic acid, phthalic acid anhydride, tetrahydrophthalic acid anhydride, glutaric acid anhydride, maleic acid, maleic acid anhydride, fumaric acid, dimeric fatty acid, dodecane dioic acid and dimethyl terephthalate. Examples of suitable polyols are monoethylene glycol, 1,2-propanediol, 1,3-propanediol, 1,4-butanediol, 3-methylpentane-1,5-diol, neopentyl glycol (2,2-dimethyl-1,3-propanediol), 1,6-hexanediol, 1,8-otaneglycol cyclohexanedimethanol, 2-methylpropane-1,3-diol, diethyleneglycol, triethyleneglycol, tetraethyleneglycol, polyethyleneglycol, dipropyleneglycol, tripropyleneglycol, tetrapropyleneglycol, polypropyleneglycol, dibutyleneglycol, tributyleneglycol, tetrabutyleneglycol and polybutyleneglycol. Alternatively, they may be obtained by ring-opening polymerization of cyclic esters, preferably caprolactone. Polyester polyols are commercially available, for example Piothane polyols available from Panolam Industries International and Dynacoll polyols available from Evonik. Other suppliers include Stepan, COIM and Lanxess. In some embodiments polyhexanediol adipate polyols are preferred.

Useful polyether polyols that can be used include linear and branched polyethers having hydroxyl groups. Examples of the polyether polyol may include a polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct of at least one compound selected from the group ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, triisopropanolamine, ethylenediamine and ethanolamine. Most preferably the polyether polyol comprises polypropylene glycol. Preferably the polyether polyol has a number average molecular weight of from 500 to 6,000 Daltons with a more preferred range of 1,000 to 3,000 Daltons. The polyether polyol may comprise a mixture of polyether polyols.

Useful polycarbonate polyols can be obtained by reaction of carbon acid derivatives, e.g. diphenyl carbonate, dimethyl carbonate or phosgene with diols. Suitable examples of such diols include ethylene glycol, 1,2- and 1,3-propanediol, 1,3- and 1,4-butanediol, 1,6-hexanediol, 1,8-octanediol, neopentyl glycol, 1,4-bishydroxymethyl cyclohexane, 2-methyl-1,3-pro-panediol, 2,2,4-trimethyl pentanediol-1,3, dipropylene glycol, polypropylene glycols, dibutylene glycol, polybutylene glycols, bisphenol A, bisphenol F, tetrabromobisphenol A as well as lactone-modified diols. In some embodiments the diol component preferably contains 40 to 100 wt % hexanediol, preferably 1,6-hexanediol and/or hexanediol derivatives. More preferably the diol component includes examples that in addition to terminal OH groups display ether or ester groups. The polycarbonate polyols should be substantially linear. However, they can optionally be slightly branched by the incorporation of polyfunctional components, in particular low-molecular polyols. Suitable examples include glycerol, trimethylol propane, hexanetriol-1,2,6, butanetriol-1,2,4, trimethylol propane, pentaerythritol, quinitol, mannitol, and sorbitol, methyl glycoside, 1,3, 4,6-dianhydrohexites.

Polyisocyanates that can be used include single polyisocyanates and mixtures of polyisocyanates. There is no limitation on the polyisocyanate(s) used as long as the weight average functionality of the polyisocyanate or polyisocyanate mixture is 2.0 or greater and less than 2.7, preferably less than 2.6 and more preferably less than 2.5 to enhance bond strength of the adhesive composition. The weight average functionality of a mixture of polyisocyanates (f NCO) is calculated as follows: fNCO=(wt % NCO1*fNCO1)+(wt % NCOi*fNCOi)+.... In other words, the weight average functionality is the sum of each weight % of a given polyisocyanate based on the total polyisocyanate weight percentage multiplied by its functionality. For example, an adhesive composition containing 30 wt %, based on the total composition weight, of a polyisocyanate having functionality of 2.7 and 15 wt. %, based on the total composition weight, of a polyisocyanate having a functionality of 2.0 yields a weight average functionality of (30/(30+15))*2.7+(15/(30+15))*2=2.47. Useful polyisocyanates include diisocyanates such as 4,4'-diphenylmethane diisocyanate (4,4' MDI); toluene diisocyanate; 1,4-diisocyanatobenzene (PPDI); 2,4'-diphenylmethane diisocyanate; 1,5-naphthalene diisocyanate; polymeric MDI; bitolylene diisocyanate; 1,3-xylene diisocyanate; p-TMXDI; 1,6-diisocyanato-2,4,4-trimethylhexane; CHDI; BDI; $H_6XDI$; IPDI; $H_{12}MDI$, polymeric versions of any of the above such as polymeric MDI, modified versions of the same such as allophanates, carbodiimides and biurets, and mixtures thereof.

The disclosed adhesive compositions include at least one acid component. Suitable acids for the component include inorganic acid and/or organic acid. Inorganic acids are those derived from one or more inorganic compounds. Organic acids are the acids which contain carbon atoms. Some exemplary inorganic acids include sulfuric acid, sulphurous acid, disulfuric acid, peroxydisulfuric acid, thiosulfuric acid, nitric acid, hyponitrous acid, phosphoric acid, hydrochloric acid, chlorous acid, chloric acid, perchloric acid, hydrofluoric acid, phosphinic acid, phosphonic acid, hypodiphosphoric acid, diphosphoric acid, triphosphoric acid, boric acid, hydrogen sulfide, chromous acid, perchromic acid, selenic acid, permanganic acid, silicic acid, antimonic acid, molybdic acid, and silicofluoric acid. Some exemplary organic acids are p-Toluenesulfonic acid, methanesulfonic acid, ethanesulfonic acid, trifluoromethanesulfonic acid, acetic acid, propionic acid, citric acid, fumaric acid, maleic acid, ethanedioic acid, adipic acid, succinic acid, lactic acid, tartaric acid, benzoic acid, salicylic acid, gallic acid, trimellitic acid, pyromellitic acid, tannic acid, glutaric acid, stearic acid, acetylsalicyclic acid, phthalic acid, and isophthalic acid. Inorganic acids such as phosphoric acid, sulfuric acid and nitric acid are preferred. Combinations of different acids can also be used. It is also possible for some or all of the acid component to be in a weak salt form such as the reaction product of an acid with a tertiary amine.

The disclosed adhesive compositions can optionally include liquid oils such as mineral oils, paraffin oils, and aromatic oils. Many liquid paraffinic oils and aromatic oils can be used such as n-paraffinic oils, iso-paraffinic oils and other branched paraffins, cycloparaffins (naphthenes), condensed cycloparaffins (including steranes and hopanes), and others with alkyl side chains on ring systems. The paraffinic oil may be a 100% n-alkanes based paraffinic oil, with a molecular formula $CH_3[CH_2]_nCH_3$. This paraffinic oil is also called liquid paraffin, white mineral oil or liquid petrolatum. Commercially available examples of the paraffinic oil include those under the trade name Citation™ NF grade from Avatar Corporation. Aromatic oils suitable for use herein include oils which contain at least one ring that has a conjugated pi-electron system with (4n+2)pi electrons, where n is an integer such as 0, 1, or 2. Such aromatic oils include those aromatic hydrocarbons containing benzene systems, condensed aromatic systems, condensed aromatic cycloalkyl systems, and others with alkyl side chains on ring systems. An example of an aromatic oil useful herein is a complex mixture of 100% aromatic hydrocarbons, commercially available under the trade name Viplex®, and Vycel® from Crowley Chemical Company, and Shellflex® from Shell Company. More information generally about liquid paraffinic oils and aromatic oils can be found in "The Chemistry and Technology of Petroleum", 4th Edition by James Speight, CRC Press, the disclosure of which is expressly incorporated herein by reference.

The composition can optionally include a catalyst. The catalyst can be any moisture curing catalyst for isocyanates, for example 2,2'-dimorpholinodiethylether, triethylenediamine, dibutyltin dilaurate and stannous octoate. While metal based catalysts can work they are preferably not used. Organic catalysts are preferred such as the tertiary amine catalyst 2,2'-dimorpholinodiethylether (DMDEE).

The composition can optionally include one or more additives. Common adhesive additives include, for example, adhesion promoters, colorants, UV pigments, fillers, oils, plasticizer, rheology modifiers and combinations thereof. Alternatively, the compositions can be essentially free of any or all of these additives.

The adhesive composition according to the present disclosure can include solvents. Preferably, the adhesive composition according to the present disclosure can be essentially free from any solvents or water in any stage of the formulation.

In one embodiment the liquid moisture curable polyurethane adhesive compositions a reaction product of a mixture comprising:

|  | range (wt. %) | narrower range (wt. %) | preferred range (wt. %) |
| --- | --- | --- | --- |
| polyisocyanate | 10-90 | 20-75 | 30-60 |
| polyol | 10-90 | 20-80 | 30-70 |
| acid | 0.001-5.0 | 0.05-1.5 | 0.05-0.5 |
| oil | 0-15 | 0-8 | 0-5 |
| catalyst | 0-3.5 | 0.001-3.0 | 0.01-2.5 |
| additives | 0-50 | 0.1-25 | 0.1-5 |

No particular method is required for preparation of the composition and standard practices can be used. In one embodiment the adhesive composition can be prepared by adding the polyol and the acid component to a reaction vessel. The reaction vessel is heated and placed under vacuum or inert gas atmosphere to remove traces of moisture. Catalyst can be added before or during heating. Once the reaction vessel is generally moisture free the polyisocyanate is added with mixing and allowed to react with the polyol. If used, additives can be added before the polyisocyanate if they will not interfere with the polyisocyanate-polyol reaction or can be added after the reaction is complete. The final adhesive composition is transferred to a moisture proof container and sealed to exclude moisture. In other embodiments the acid component is added after reaction of the polyisocyanate and polyol in complete.

The disclosed liquid moisture curable polyurethane adhesive compositions are particularly suited for use as an adhesive in reinforced composite structures. One example is the large reinforced composite panels used in making recreational vehicles. Such reinforced composite panels typically include one or two panels or "skins" laminated to opposing sides of a reinforcing metal frame. The skins can comprise, for example, wood or wood products, plastics, fiber reinforced plastics (FRP), metals or metal foils, high pressure laminate (HPL) skins, or other materials. Typically the exterior skin is plastic or plastic composite to resist weathering. If an internal skin is desired, it is typically wood or laminated wood such as Lauan plywood. The frame typically comprises a plurality of tubular metal sections that are welded together to form a structural frame. Generally, the tubular metal sections have a quadrilateral cross sectional shape with bonding surfaces defined on opposing sides of the shape. Structural aluminum pieces are used in recreational vehicles almost exclusively to lessen weight of the frame and vehicle. Materials such as expanded polystyrene (EPS) foam sheet can be disposed between the skins in space not taken by the frame. A panel lamination process includes: disposing a one component, liquid adhesive on some of the surfaces to be laminated; optionally misting the adhesive with water to accelerate curing; placing the skin or skins in contact with adhesive disposed on the frame surfaces; placing the assembled parts in a press to apply pressure and heat to the assembled parts and maintain the parts in position until substantially cured; and routing or stocking of the parts from the press after the initial cure of the adhesive. For multiple layers this process is repeated until the final lamination stack has been assembled. Then the final lamination stack is moved to a press station wherein the press applies pressure to the lamination stack and the adhesive can develop its initial strength through an initial cure, i.e., develops green strength, as is known in the industry. Once sufficient initial or green strength is developed the lamination stack is moved out of the press and routed to the next station. The disclosed liquid, moisture curable, polyurethane adhesive compositions provide enhanced bond strength to the aluminum frame compared to conventional adhesives.

For reinforced composite panels used in vehicles it is desired to have a % adhesion of at least about 30%, preferably at least about 50%, more preferably at least about 70% and most preferably 90%. An adhesion % of 100% would be ideal as it denotes the substrate fails before the adhesive bond. While some of these adhesion strengths can be achieved with conventional adhesives in combination with anodized or conversion coated aluminum frame members it has not been possible to consistently achieve even the 30% adhesion strength using conventional adhesives with mill grade aluminum frame members, e.g. aluminum frame members as received from a mill with no cleaning and no conversion coating or anodizing.

Experimental Data

Viscosity of the products, in centipoise (cP), was measured at 25° C. using a Brookfield viscometer model DV-I Prime with a number 27 spindle.

NCO % was monitored using a Brinkman Metrohm automatic titrator.

% adhesion was tested by applying the test composition to an untreated piece of mill grade, hollow rectangular aluminum tubing at an effective coating weight of 10 to 12 grams per square foot (gsf). The mill grade aluminum was used as received, it was not cleaned or anodized or conversion coated before testing. The applied composition was misted with water. A piece of Lauan plywood (approximately 3 mm thick) was disposed over the applied adhesive and vacuum pressed onto the adhesive and tubing for 1 hour. The laminate was allowed to cure for two days at room temperature and ambient moisture conditions. Adhesion of Lauan plywood to aluminum was tested by attempting to pry the plywood off of the tubing using a spatula. The percentage of Lauan plywood failure was visually assessed based on the amount of wood remaining bonded to the aluminum e.g., 90% adhesion means 90% of the wood remains bonded (a good result) while 10% adhesion means 10% of the wood remains bonded (a failing result). The results were recorded.

The compounds used in the experimental formulations are as follows. PPG 1000 is a polypropylene glycol, hydroxyl functionality of 2.0, with a molecular weight of about 1,000 and is available from Covestro. PPG 2000 is a polypropylene glycol, hydroxyl functionality of 2.0, with a molecular weight of about 2,000 and is available from Covestro. Mondur MR is a mixture of 4,4'-methylene diphenyl diisocyanate (4,4'-MDI) isomer and polymeric MDI (p-MDI) having a functionality of about 2.7 and is available from Covestro. Mondur MRS2 is a mixture of 4,4'-methylene diphenyl diisocyanate (4,4'-MDI) isomer and polymeric MDI (p-MDI) having a functionality of about 2.2 and is available from Covestro. 2,2'-dimorpholinodiethylether (available as Jeffcat® DMDEE from Huntsman Corp.) a tertiary amine catalyst. Silquest A-Link 35 is an isocyanate functional silane also having trimethoxy silyl functionality and is available from Momentive Performance materials. Silquest A 1110 is a primary amino silane and is available from Momentive Performance materials. Sylvalite 10 is a liquid rosin ester tackifier available from Kraton. The acids used are well known laboratory materials and are available commercially.

The compositions shared the same general formula shown below.

| material | amount in parts by weight |
|---|---|
| PPG 1000 | 27 |
| PPG 2000 | 27 |
| polyisocyanate | 46 |
| additives | less than about 1.5 |

Comparative Example A 270 parts of PPG1000, 270 parts of PPG 2000 and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Example 1

270 parts of PPG1000, 270 parts of PPG 2000, 1.5 parts sulfuric acid (laboratory grade 96%) and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Example 2

270 parts of PPG1000, 270 parts of PPG 2000, 1.5 parts phosphoric acid (commercial grade 85%) and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Example 3

270 parts of PPG1000, 270 parts of PPG 2000, 1.5 parts methanesulfonic acid (laboratory grade) and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Example 4

270 parts of PPG1000, 270 parts of PPG 2000, 1.5 parts propionic acid (laboratory grade) and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Comparative Example B 270 parts of PPG1000, 270 parts of PPG 2000, 10 parts of Sylvalite 10 and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The reaction product was transferred to a moisture proof container and sealed.

Comparative Example C 270 parts of PPG1000, 270 parts of PPG 2000, and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The temperature was lowered to about 60° C. and 4 parts Silquest A 1110 was added with stirring. The reaction product was transferred to a moisture proof container and sealed.

Comparative Example D 270 parts of PPG1000, 270 parts of PPG 2000, and 4.7 parts DMDEE was added to a reactor and heated to 80° C. under a nitrogen gas atmosphere. 460 parts Mondur MRS2 was added to the reactor with stirring. The mixture was stirred for 1.5 hours under nitrogen atmosphere and at 80° C. The temperature was lowered to about 60° C. and 4 parts Silquest A-Link 35 was added with stirring. The reaction product was transferred to a moisture proof container and sealed.

Example 5

270 parts of PPG1000, 270 parts of PPG 2000, 1.5 parts sulfuric acid (laboratory grade 96%) and 4.7 parts DMDEE was added to a reactor and heated to 80° C. under a nitrogen gas atmosphere. 230 parts Mondur MRS2 and 230 parts Mondur MR were added to the reactor with stirring. The mixture was stirred for 1.5 hours under nitrogen atmosphere and at 80° C. The reaction product was transferred to a moisture proof container and sealed.

Comparative Example E 270 parts of PPG1000, 270 parts of PPG 2000, 1.5 parts sulfuric acid (laboratory grade 96%) and 4.7 parts DMDEE was added to a reactor and heated to 80° C. under a nitrogen gas atmosphere. 460 parts Mondur MR was added to the reactor with stirring. The mixture was stirred for 1.5 hours under nitrogen atmosphere and at 80° C. The reaction product was transferred to a moisture proof container and sealed.

The compositions were tested for adhesion. Formulations and results are provided in the following TABLES. All amounts are in parts by weight.

| example | 1 | 2 | 3 | 4 | 5 |
|---|---|---|---|---|---|
| PPG 1000 | 270 | 270 | 270 | 270 | 270 |
| PPG 2000 | 270 | 270 | 270 | 270 | 270 |
| Mondur MRS2 | 460 | 460 | 460 | 460 | 230 |
| Mondur MR | 0 | 0 | 0 | 0 | 230 |
| ave. NCO funct (f) | f = 2.2 | f = 2.2 | f = 2.2 | f = 2.2 | f = 2.45 |
| sulfuric acid | 1.5 | 0 | 0 | 0 | 1.5 |
| phosphoric acid | 0 | 1.5 | 0 | 0 | 0 |
| methanesulfonic acid | 0 | 0 | 1.5 | 0 | 0 |
| propionic acid | 0 | 0 | 0 | 1.5 | 0 |
| DMDEE | 4.7 | 4.7 | 4.7 | 4.7 | 4.7 |
| additive | 0 | 0 | 0 | 0 | 0 |
| total | 1006.2 | 1006.2 | 1006.2 | 1006.2 | 1006.2 |
| viscosity (cP) | 8313 | 9425 | 7700 | 7850 | 27300 |
| % adhesion | 90[4] | 90[4] | 80[4] | 80[4] | 30 |

1 Sylvalite 10 tackifier
2 Silquest A1110 silane adhesion promoter
3 Silquest A-Link 35 silane adhesion promoter
4 see FIG. 1

| example | A | B | C | D | E |
|---|---|---|---|---|---|
| PPG 1000 | 270 | 270 | 270 | 270 | 270 |
| PPG 2000 | 270 | 270 | 270 | 270 | 270 |
| Mondur MRS2 | 460 | 460 | 460 | 460 | 0 |
| Mondur MR | 0 | 0 | 0 | 0 | 460 |
| ave. NCO funct (f) | f = 2.2 | f = 2.2 | f = 2.2 | f = 2.2 | f = 2.7 |
| sulfuric acid | 0 | 0 | 0 | 0 | 1.5 |
| phosphoric acid | 0 | 0 | 0 | 0 | 0 |
| methanesulfonic acid | 0 | 0 | 0 | 0 | 0 |
| propionic acid | 0 | 0 | 0 | 0 | 0 |
| DMDEE | 4.7 | 4.7 | 4.7 | 4.7 | 4.7 |
| additive | 0 | 10[1] | 4[2] | 4[3] | 0 |
| total | 1004.7 | 1014.7 | 1008.7 | 1008.7 | 1006.2 |
| viscosity (cP) | 6836 | 7350 | 8850 | 6925 | 68400 |
| % adhesion | 10[4] | 10 | 10 | 10 | 10 |

1 Sylvalite 10 tackifier
2 Silquest A1110 silane adhesion promoter
3 Silquest A-Link 35 silane adhesion promoter
4 see FIG. 1

The composition of Example A illustrates a conventional polyurethane adhesive used to bond composite structures comprising aluminum frames under a worst case commercial situation, e.g., aluminum as received from a mill with no cleaning and no conversion coating or anodizing. This adhesive has a low level of bond strength that would not be desirable in many applications.

One conventional way to increase adhesive bond strength is incorporating tackifiers in the adhesive composition. The composition of Example B illustrates an attempt to increase bond strength using tackifier additives. The addition of tackifier did not improve bond strength of that composition.

One conventional way to increase adhesive bond strength is incorporating silane adhesion promoters in the composition. The composition of Example C illustrates an attempt to increase bond strength using an aminosilane adhesion promoter. The addition of this aminosilane adhesion promoter did not improve bond strength.

The composition of Example D illustrates an attempt to increase bond strength using an isocyanate functional silane with trimethoxy silyl functionality adhesion promoter. The addition of this isocyanate functional silane adhesion promoter did not improve bond strength of that composition.

Another conventional way of increasing adhesive bond strength is conversion coating the aluminum substrate. Tests show that bonding Lauan plywood to a properly anodized aluminum substrate using a conventional adhesive with no acid provides an increase in the % adhesion compared to adhesion on mill grade aluminum substrates. However, this improvement requires additional labor, time and cost for the extra transportation and processing of the aluminum. The disclosed adhesives provide a stronger bond to mill grade aluminum without any cleaning or conversion coating. Using the disclosed adhesives with an anodized aluminum substrate consistently shows an improvement in adhesion strength as compared to conventional adhesives.

Example 1 illustrates the effect of adding a small amount of acid to the conventional composition of Example A. Adding 1.5 parts by weight (about 0.15 wt. %) of sulfuric acid provided an unexpected and surprising increase in bond strength from 10% of the bonded wood remaining to 90% of the bonded wood remaining. Even more surprising, this increase was obtained with no conversion coating or other pretreatment of the aluminum and no washing to remove dirt, grease and oil.

Example 2 illustrates the effect of adding a small amount of acid to the conventional composition of Example A. Adding 1.5 parts by weight (about 0.15 wt. %) of phosphoric acid provided an unexpected and surprising increase in bond strength from 10% of the bonded wood remaining to 90% of the bonded wood remaining. Even more surprising, this increase was obtained with no conversion coating or other pretreatment of the aluminum and no washing to remove dirt, grease and oil.

Example 3 illustrates the effect of adding a small amount of acid to the conventional composition of Example A. Adding 1.5 parts by weight (about 0.15 wt. %) of methanesulfonic acid provided an unexpected and surprising increase in bond strength from 10% of the bonded wood remaining to 80% of the bonded wood remaining. Even more surprising, this increase was obtained with no conversion coating or other pretreatment of the aluminum and no washing to remove dirt, grease and oil.

Example 4 illustrates the effect of adding a small amount of acid to the conventional composition of Example A. Adding 1.5 parts by weight (about 0.15 wt. %) of propionic acid provided an unexpected and surprising increase in bond strength from 10% of the bonded wood remaining to 80% of the bonded wood remaining. Even more surprising, this increase was obtained with no conversion coating or other pretreatment of the aluminum and no washing to remove dirt, grease and oil.

Example 5 illustrates the effect of isocyanate functionality on the bond strength of the composition. Example 1 using 460 parts of Mondur MRS2 (a mixture of 4,4'-methylene diphenyl diisocyanate (4,4'-MDI) isomer and polymeric MDI (p-MDI) having a functionality (f) of about 2.2) and 1.5 parts by weight (about 0.15 wt. %) of sulfuric acid provided an unexpected and surprising increase in bond strength from 10% of the bonded wood remaining to 90% of the bonded wood remaining with no conversion coating. Example 5 uses the same composition as Example 1 but replaces 230 parts of Mondur MRS2 with 230 parts Mondur MR (a mixture of 4,4'-methylene diphenyl diisocyanate (4,4'-MDI) isomer and polymeric MDI (p-MDI) having a functionality of about 2.7). Example 5 has a higher functionality than Example 1.

Although the increased polyisocyanate functionality lowered the bond strength to 30%, it was still a surprising increase over the 10% bond strength of Example A.

Example E uses the same composition as Example 1 but replaces all of the Mondur MRS2 (f=2.2) with the same amount of Mondur MR (f=2.7). Example E has a higher average functionality (f-2.7) than Example 1 (f=2.2). Example E, with a higher isocyanate functionality than Example 1, has a much lower bond strength than Example 1. The bond strength of Example E showed no improvement over Example A. Thus, the increased isocyanate functionality negated any bond strength advantage provided by adding acid.

Examples 6-10

Figure 2:
FIG. 2 illustrates % adhesion of some one component, liquid, moisture curable polyurethane adhesive composition to a second sample of a mill grade aluminum substrate.

Testing was run a second time using a second sample of mill grade aluminum different from the first sample of mill grade aluminum and the previous adhesive compositions. The aluminum was used as received and was not cleaned or conversion treated prior to testing. Formulations and results are provided in the following TABLE. All amounts are in parts by weight. Results are shown in FIG. 2.

| example | 6 | 7 | 8 | 9 | F |
|---|---|---|---|---|---|
| PPG 1000 | 270 | 270 | 270 | 270 | 270 |
| PPG 2000 | 270 | 270 | 270 | 270 | 270 |
| Mondur MRS2 | 460 | 460 | 460 | 460 | 460 |
| ave. NCO funct (f) | f = 2.2 | f = 2.2 | f = 2.2 | f = 2.2 | f = 2.2 |
| sulfuric acid | 1.5 | 0 | 0 | 0 | 0 |
| phosphoric acid | 0 | 1.5 | 0 | 0 | 0 |
| methanesulfonic acid | 0 | 0 | 1.5 | 0 | 0 |
| propionic acid | 0 | 0 | 0 | 1.5 | 0 |
| DMDEE | 4.7 | 4.7 | 4.7 | 4.7 | 4.7 |
| additive | 0 | 0 | 0 | 0 | 0 |
| total | 1006.2 | 1006.2 | 1006.2 | 1006.2 | 1004.7 |
| % adhesion | 80 | 70 | 10 | 20 | 0 |

This second sample of mill grade aluminum formed weaker bonds compared to the previous sample of mill grade aluminum. Thus, mill grade aluminum varies in its ability to form an adhesive bond from lot to lot and supplier to supplier. Despite the variability compositions 6 and 7 comprising inorganic acids maintained surprisingly improved bond strength. Compositions 8 and 9 comprising organic acids had improved bond strength compared to comparative adhesive F but would not be preferred as the strengths are substantially lower than the disclosed adhesive compositions.

Examples 10-11

Figure 3:
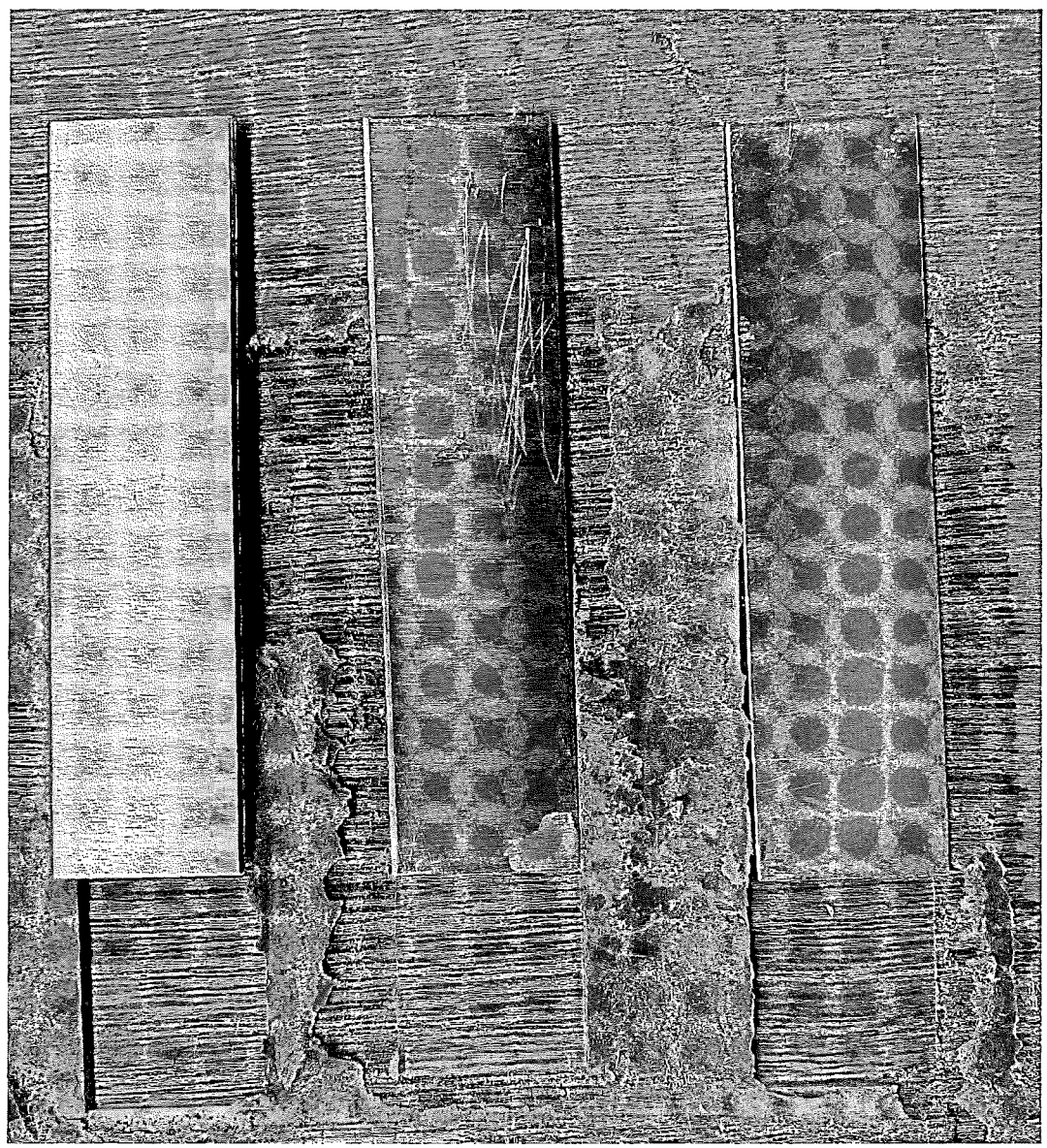
FIG. 3 illustrates % adhesion of some one component, liquid, moisture curable polyurethane adhesive composition to a first sample of a mill grade stainless steel substrate.

The adhesive compositions were tested for adhesion to untreated stainless steel using the same procedure as previously used for aluminum. The stainless steel samples were used as received and were not cleaned or conversion treated prior to testing. Formulations and results are provided in the following TABLE. All amounts are in parts by weight. Results are shown in FIG. 3.

| example | 10 | 11 | G |
|---|---|---|---|
| PPG 1000 | 270 | 270 | 270 |
| PPG 2000 | 270 | 270 | 270 |
| Mondur MRS2 | 460 | 460 | 460 |
| ave. NCO funct (f) | f = 2.2 | f = 2.2 | f = 2.2 |
| sulfuric acid | 1.5 | 0 | 0 |
| phosphoric acid | 0 | 1.5 | 0 |
| DMDEE | 4.7 | 4.7 | 4.7 |
| additive | 0 | 0 | 0 |
| total | 1006.2 | 1006.2 | 1004.7 |
| % adhesion | 0 | 0 | 0 |

The stainless steel substrates had essentially no adhesion to lauan substrates with comparative adhesive composition G or disclosed adhesive compositions 10 or 11. While the adhesion of stainless steel substrates was not improved using the disclosed adhesive compositions the adhesion to aluminum is greatly improved using the same adhesive compositions. The selectivity confirms the surprising effect of the disclosed adhesive compositions with aluminum.

The terminology used herein is for the purpose of describing particular example embodiments only and is not intended to be limiting. The method steps, processes, and operations described herein are not to be construed as necessarily o adding requiring their performance in the particular order discussed or illustrated, unless specifically identified as an order of performance. It is also to be understood that additional or alternative steps may be employed.

We claim:

1. A method of making a bonded reinforced composite structure, comprising:
   providing an aluminum frame having a first bonding surface;
   providing a first panel having a bonding surface;
   providing a one component, liquid, moisture curable polyurethane adhesive composition, wherein the adhesive composition includes the reaction products of a mixture comprising at least one polyol, an excess of at least one organic polyisocyanate, and an acid component in acid form and/or salt form, wherein the acid component is selected from the group consisting of nitric acid, sulfuric acid, methanesulfonic acid, phosphonic acid, phosphoric acid, propionic acid, and any combination thereof;
   applying the adhesive composition to the aluminum frame first bonding surface, the first panel bonding surface, or both;
   disposing the first panel bonding surface in contact with the aluminum frame first bonding surface to form a composite structure; and
   curing the adhesive to bond the first panel to the aluminum frame.

2. The method of claim 1, further comprising exposing the applied adhesive to water before disposing the first panel bonding surface in contact with the aluminum frame first bonding surface.

3. The method of claim 1, wherein the method comprises placing the composite structure in a press, wherein the curing is at least partially done while the composite structure is in the press.

4. The method of claim 1, wherein:
   the aluminum frame has a quadrilateral cross section and a second bonding surface opposing the first bonding surface; and the method further comprises:
      providing a second panel having a bonding surface;
      applying the adhesive composition to the aluminum frame second bonding surface, the second panel bonding surface, or both;
      disposing the second panel bonding surface in contact with the aluminum frame second bonding surface; and
      curing the adhesive to bond the second panel to the aluminum frame.

5. The method of claim 1, wherein at least one aluminum frame bonding surface is mill grade with no cleaning.

6. The method of claim 1, wherein at least one aluminum frame bonding surface has no surface conversion coating and/or anodizing.

7. The method of claim 1, wherein at least one aluminum frame bonding surface is conversion coated.

8. The method of claim 1, wherein the first panel comprises a cured polymer, plywood, or a combination thereof.

9. The method of claim 1, wherein the composite structure is free of mechanical fasteners to hold the first panel to the aluminum frame.

10. The method of claim 1, wherein the organic polyisocyanate has an average functionality in the range of from about 2.0 to about 2.4.

11. The method of claim 1, wherein the acid component consists of nitric acid, sulfuric acid, phosphonic acid, phosphoric acid, and any combination thereof.

12. The method of claim 1, wherein the acid component consists of nitric acid, sulfuric acid, phosphoric acid, and any combination thereof.

13. The method of claim 1, further comprising disposing insulation in a void area defined by the aluminum frame and first panel bonding surface.

14. The method of claim 1, wherein the acid component is selected from the group consisting of nitric acid, sulfuric acid, methanesulfonic acid, phosphonic acid, propionic acid, and any combination thereof.

15. The method of claim 1, wherein the adhesive composition comprises:
   about 10 wt. % to about 90 wt. % of the at least one organic polyisocyanate,
   about 10 wt. % to about 90 wt. % of the at least one polyol, and
   about 0.001 wt. % to about 5 wt. % of the acid component,
   wherein each wt. % is based on the total weight of the adhesive composition.

16. The method of claim 1, wherein the adhesive composition comprises:
   about 20 wt. % to about 75 wt. % of the at least one organic polyisocyanate,
   about 20 wt. % to about 80 wt. % of the at least one polyol, and
   about 0.05 wt. % to about 1.5 wt. % of the acid component,
   wherein each wt. % is based on the total weight of the adhesive composition.

17. The method of claim 1, wherein the adhesive composition comprises:
   about 30 wt. % to about 60 wt. % of the at least one organic polyisocyanate,
   about 30 wt. % to about 70 wt. % of the at least one polyol, and
   about 0.05 wt. % to about 0.5 wt. % of the acid component,
   wherein each wt. % is based on the total weight of the adhesive composition.

18. A one component, liquid, moisture curable polyurethane adhesive composition comprising the reaction products of a mixture including at least one polyol, an excess of at least one organic polyisocyanate, and an acid component in acid form and/or salt form, wherein the acid component is selected from the group consisting of nitric acid, sulfuric acid, methanesulfonic acid, phosphonic acid, phosphoric acid, propionic acid, and any combination thereof.

19. The one component, liquid, moisture curable polyurethane adhesive composition of claim 18, wherein the acid component is selected from nitric acid, sulfuric acid, phosphonic acid, and any combination thereof.

20. The one component, liquid, moisture curable polyurethane adhesive composition of claim 18, wherein the acid component is selected from the group consisting of nitric acid, sulfuric acid, methanesulfonic acid, phosphonic acid, propionic acid, and any combination thereof.

* * * * *